(12) United States Patent
Narra et al.

(10) Patent No.: US 11,924,710 B2
(45) Date of Patent: *Mar. 5, 2024

(54) LOCATION SELECTION FOR TRANSMITTING EMERGENCY BEACONS

(71) Applicant: Apple Inc., Cupertino, CA (US)

(72) Inventors: Shiva Krishna Narra, San Jose, CA (US); Sanjeevi Balasubramanian, San Jose, CA (US); Dhruv Khati, San Jose, CA (US); Anjaneyulu Maganti, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/322,780

(22) Filed: May 17, 2021

(65) Prior Publication Data
US 2022/0109954 A1    Apr. 7, 2022

Related U.S. Application Data

(63) Continuation of application No. 16/407,146, filed on May 8, 2019, now Pat. No. 11,012,816.

(51) Int. Cl.
*H04W 4/029*      (2018.01)
*H04W 4/02*       (2018.01)
(Continued)

(52) U.S. Cl.
CPC ........... *H04W 4/029* (2018.02); *H04W 4/021* (2013.01); *H04W 4/027* (2013.01); *H04W 4/70* (2018.02)

(58) Field of Classification Search
CPC ..... H04W 4/029; H04W 4/023; H04W 84/18; H04W 4/024; H04W 4/02; H04W 4/021;
(Continued)

(56) References Cited

U.S. PATENT DOCUMENTS 8,423,290 B1 *   4/2013  Walsh ................. G01C 21/34
                                                340/995.19
9,418,372 B2    8/2016  Heerboth
(Continued)

FOREIGN PATENT DOCUMENTS

CN      103108405      5/2013
CN      103686985      3/2014
(Continued)

*Primary Examiner* — Umair Ahsan
(74) *Attorney, Agent, or Firm* — Fish & Richardson P.C.

(57) ABSTRACT

Embodiments are disclosed for selecting locations for transmitting emergency beacons. In an embodiment, a method comprises: determining a current location of a mobile device in a geographic area; configuring a transmitter of the mobile device for device-to-device (D2D) communication; determining one or more candidate transmit locations for D2D communication, wherein each candidate transmit location is determined based at least in part on its elevation, proximity to a D2D device density location that is within a maximum communication distance from the candidate transmit location, and an availability of a trail or path to the candidate transmit location; receiving input selecting a particular candidate transmit location from the one or more candidate transmit locations; in accordance with the input, determining a route from the current location of the mobile device to the particular candidate transmit location; and presenting the route through an output device.

20 Claims, 4 Drawing Sheets

(51) Int. Cl.
*H04W 4/021* (2018.01)
*H04W 4/70* (2018.01)

(58) Field of Classification Search
CPC ....... H04W 88/02; G01C 21/20; G01C 21/34; G01C 21/3438; G01C 21/3667; G01C 21/3682

See application file for complete search history.

(56) References Cited

U.S. PATENT DOCUMENTS

| | | | |
|---|---|---|---|
| 10,057,752 B2 | 8/2018 | Pais et al. | |
| 10,638,293 B2 | 4/2020 | Tabet et al. | |
| 11,012,816 B2 | 5/2021 | Nana et al. | |
| 2014/0081971 A1* | 3/2014 | Johnson | H04W 4/023 707/736 |
| 2014/0192735 A1 | 7/2014 | Sridharan et al. | |
| 2014/0334354 A1 | 11/2014 | Satori et al. | |
| 2015/0173038 A1 | 6/2015 | Quan et al. | |
| 2015/0208384 A1 | 7/2015 | Baghel | |
| 2015/0230257 A1 | 8/2015 | Hagerman et al. | |
| 2015/0247736 A1* | 9/2015 | Moore | G01C 21/367 701/519 |
| 2015/0270939 A1 | 9/2015 | Ro et al. | |
| 2015/0351114 A1 | 12/2015 | Wolf et al. | |
| 2016/0065362 A1 | 3/2016 | Choyi et al. | |
| 2016/0069697 A1* | 3/2016 | Oel | G01C 21/3476 701/426 |
| 2016/0242221 A1 | 8/2016 | Jung et al. | |
| 2016/0262100 A1 | 9/2016 | Larsson et al. | |
| 2016/0302250 A1 | 10/2016 | Sheng | |
| 2016/0323869 A1 | 11/2016 | Xu et al. | |
| 2016/0360432 A1* | 12/2016 | Graffagnino | H04W 24/02 |
| 2017/0013413 A1* | 1/2017 | Singh | H04W 24/02 |
| 2017/0142741 A1 | 5/2017 | Kaur et al. | |
| 2017/0150326 A1 | 5/2017 | Hampel et al. | |
| 2017/0238316 A1 | 8/2017 | Li et al. | |
| 2017/0134146 A1 | 11/2017 | Chae et al. | |
| 2018/0213382 A1 | 7/2018 | Tabet et al. | |
| 2018/0249295 A1* | 8/2018 | Moraru | H04W 84/18 |
| 2019/0182626 A1* | 6/2019 | Miller | H04W 4/029 |
| 2020/0359173 A1 | 11/2020 | Nana et al. | |

FOREIGN PATENT DOCUMENTS

| | | |
|---|---|---|
| CN | 104219758 | 12/2014 |
| CN | 105453614 | 3/2016 |
| CN | 107979827 | 5/2018 |
| EP | 3396992 | 10/2018 |

\* cited by examiner

LOCATION SELECTION FOR TRANSMITTING EMERGENCY BEACONS

CROSS-REFERENCE TO RELATED APPLICATION

This application is a continuation of and claims priority to U.S. patent application Ser. No. 16/407,146, filed May 8, 2019, the entire contents of which is incorporated herein by reference.

TECHNICAL FIELD

This disclosure relates generally to device-to-device (D2D) communication, and more particularly to using D2D communication for emergency assistance.

BACKGROUND

Because of their utility, mobile devices, such as smartphones, are standard equipment for hikers, backpackers, mountain climbers, skiers and other outdoor enthusiasts. Most smartphones include terrestrial and satellite-based localization technology for obtaining a position fix, and an electronic compass for obtaining a heading. A map application provides maps with routes, such as hiking trails. The map shows a marker of the user's location on the route and a direction indicator that indicates their direction of travel. Most mobile devices also include a wireless transceiver that allows the user to communicate with other mobile devices through wireless local area networks (e.g., WiFi, Bluetooth) and cellular networks.

Some mobile devices are also enabled with D2D communication capability, which allows direct wireless communication between two mobile users without assistance from a base station or core network. In the case of a natural disaster (e.g., hurricane, earthquake), conventional cellular communication networks may not work. In such disaster scenarios, a wireless ad hoc network can be established between two or more D2D devices to obtain emergency assistance. If a user (e.g., a hiker), however, is alone in an emergency situation in a remote area (e.g., a forest) where no cellular or WiFi service is available, the user may not know in which direction to walk to increase their odds of establishing D2D communication with other D2D-enabled devices to obtain emergency assistance.

SUMMARY

Embodiments are disclosed for selecting locations for transmitting emergency beacons.

In an embodiment, a method comprises: determining, using a location processor of a mobile device, a current location of the mobile device in a geographic area; configuring a transmitter of the mobile device for device-to-device (D2D) communication; determining, using one or more processors of the mobile device, one or more candidate transmit locations for D2D communication, wherein each candidate transmit location is determined based at least in part on its elevation, proximity to a D2D device density location that is within a maximum communication distance from the candidate transmit location, and an availability of a trail or path to the candidate transmit location; receiving input selecting a particular candidate transmit location from the one or more candidate transmit locations; in accordance with the input, determining, using the one or more processors, a route from the current location of the mobile device to the particular candidate transmit location; and presenting the route through an output device of the mobile device.

In an embodiment, a mobile device comprises: a location processor configured to determine a current location of the mobile device in a geographic area; a transmitter configured for device-to-device (D2D) communication; an input device; an output device; one or more processors; one or more sensors; memory storing instructions that when executed by the one or more processors, cause the one or more processors to perform operations comprising: determining one or more candidate transmit locations for D2D communication with D2D-enabled devices, wherein each candidate transmit location is determined based at least in part on its elevation, proximity to a D2D device density location that is within a maximum communication distance from the candidate transmit location, and availability of a trail or path to the candidate transmit location; receiving input selecting a particular candidate transmit location from the one or more candidate transmit locations; in accordance with the input, determining a route from the current location of the mobile device to the selected candidate transmit location; and presenting the route through an output device of the mobile device.

In an embodiment, a non-transitory, computer-readable storage medium includes instructions, that when executed by one or more processors, cause the one or more processors to perform operations comprising: determining a current location of a mobile device in a geographic area; configuring a transmitter of the mobile device for device-to-device (D2D) communication; determining one or more candidate transmit locations for D2D communication, wherein each candidate transmit location is determined based at least in part on its elevation, proximity to a D2D device density location that is within a maximum communication distance from the candidate transmit location, and an availability of a trail or path to the candidate transmit location; receiving input selecting a particular candidate transmit location from the one or more candidate transmit locations; in accordance with the input, determining a route from the current location of the mobile device to the particular candidate transmit location; and presenting the route through an output device of the mobile device.

One or more of the disclosed embodiments provide one or more of the following advantages. The disclosed embodiments provide hikers and other outdoor enthusiasts with a means to obtain emergency assistance using their D2D-enabled device when confronted with an emergency situation in a geographic area with no cellular or WiFi service.

The details of one or more implementations of the subject matter are set forth in the accompanying drawings and the description below. Other features, aspects and advantages of the subject matter will become apparent from the description, the drawings and the claims.

DETAILED DESCRIPTION

Figure 1:
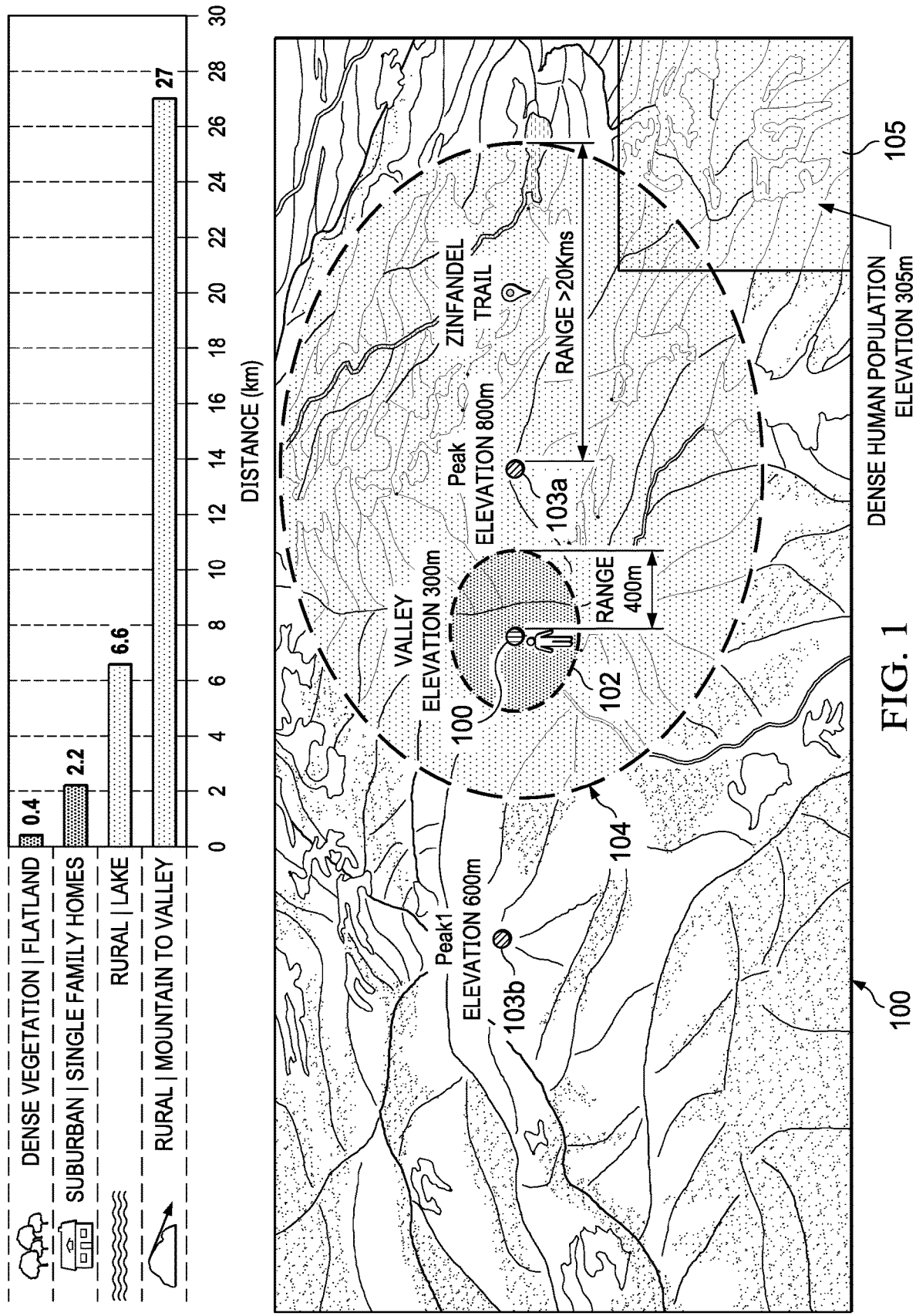
FIG. 1 illustrates the concept of candidate transmit locations, according to an embodiment.

A user in an emergency situation at a geographic location where there is no cellular or WiFi service is provided with one or more candidate transmit locations from which the user can transmit an emergency beacon from their D2D-enabled device to a location that has a high density of D2D-enabled devices (referred to herein as a "D2D device density location"). The user can select one of the candidate transmit locations and receive a route and direction of travel (e.g., a heading) to the selected candidate transmit location. In an embodiment, the one or more candidate transmit locations are determined based on the user's current location, their proximity to one or more D2D device density locations and the availability of a trail or path from the user's current location to the candidate transmit locations.

In an embodiment, the candidate transmit locations are displayed in a graphical user interface (GUI) presented through an output device (e.g., a touch screen) of the user's D2D-enabled device. For example, the candidate transmit locations can be displayed in sorted order (e.g., from most recommended to least recommended) according to one or more factors, such as the distance to the candidate transmit location from the user's current location and/or an estimated time of arrival (ETA) to the selected candidate transmit location. In an embodiment, a base ETA is computed based on trail/path length and an average hiking/walking speed of the user. The ETA can be adjusted based on the difficulty of the terrain for hiking (e.g., steep inclines, dense vegetation), the trail/path condition (e.g., rocky, smooth, paved, slippery, muddy), weather conditions (e.g., snow, rain, wind), the physical condition of the user (e.g., healthy or partially disabled by one or more injuries), the skill level or experience of the user (e.g., novice, intermediate or expert hiker) and any other suitable factors.

In an embodiment, sensor data provided by one or more motion sensors (e.g., accelerometer and/or gyro data) of the user's D2D-enabled device are used to detect the physical condition of the user, such as a change in the user's gait which may indicate a leg injury that could prevent the user from hiking long distances or hiking up or down steep terrain. In an embodiment where the user's D2D-enabled device is a wearable computer (e.g., a smartwatch), a heart rate sensor is used to measure the user's heart rate variability (HRV) which is used to indicate the health status, stress level and/or mental effort of the user. Additional time adjustments are made to the base ETA calculation if the sensor data indicates the user is injured.

In an embodiment, D2D device density locations are divided into grids and each cell (e.g., 10 mile by 10 mile) in the grid is assigned a probability that at least one D2D-enabled device is operating in the cell. In an embodiment, the probability is determined using crowdsourced location data from D2D-enabled devices operating at the D2D device density location. In an embodiment, the probability for each cell is periodically updated using new crowdsourced location data. In an embodiment, D2D device density locations are selected from geographic areas of dense human population (e.g., cities, towns, areas frequently visited) based on the reasonable assumption that more densely populated areas or frequently visited areas will have more D2D-enable devices in operation that could potentially receive an emergency beacon.

In an embodiment, the user's D2D-enabled device determines if there are any D2D-enabled devices in the near vicinity, and if so, it attempts to establish an ad hoc wireless network with those devices. This scenario could occur, for example, if there are other users (e.g., other hikers) within scanning distance of the user and who have their D2D-enabled devices turned on and in discovery mode (e.g., using burst-mode synchronization). If there are no D2D-enabled devices in the near vicinity, the system proceeds to select one or more candidate transmit locations as previously described above. At a user-selected candidate location, the user transmits an emergency beacon using their D2D-enabled device. One or more other D2D-enabled devices operating at the D2D device density location can receive the beacon and be joined into a wireless ad hoc network with the user.

In an embodiment, any D2D-enabled device in the ad hoc network can relay the emergency beacon to other D2D-enabled devices in the local ad hoc wireless network (or in another ad hoc wireless network) using multi-hop communication. In this manner, the user's emergency beacon can be relayed to a D2D-enabled device in an area that has cellular or WiFi service/coverage, so that emergency first responders can be informed of the emergency and provided the current location of the user.

System Overview

FIG. 1 illustrates the concept of candidate transmit locations, according to an embodiment. In this example, user 101 is located in a valley next to a first mountain in a geographic area (e.g., a national park). The valley has an elevation of about 300 meters above sea level. A first mountain peak 103a is at an elevation of 800 meters above sea level. On the opposite side of the valley a second mountain peak 103b is at an elevation of 600 meters above sea level. On the other side of the first mountain is D2D device density location 105 which has a dense human population and is at an elevation of 305 meters above sea level.

User 101 is carrying a D2D-enabled device (e.g., a smart phone) that has a maximum communication distance 102 in the valley of about 400 meters. The horizontal bar chart in FIG. 1 illustrates example maximum D2D communication distances in kilometers (km) for various types of terrain. Note that the mountain to valley terrain provides the highest maximum communication distance of about 27 km and the valley terrain provides the lowest maximum communication distance at 400 meters. Thus, the height of the transmission antenna affects the maximum communication distance, as described more fully in reference to FIG. 2.

In an embodiment, an emergency assistance application is invoked on the user's D2D-enabled device. The application can be invoked manually by the user through interaction with graphical user interface (GUI) affordance or voice command, invoked automatically in response to a trigger event or another application, or invoked remotely by another device. The emergency assistance application searches a terrain map database covering the geographic area to determine the highest candidate transmit locations (in terms of elevation) that can be reached by a trail/path that is in close proximity to the current location of the user (e.g., within a specified radial distance from the user's current location). In an embodiment, the user's current location is determined by a location processor of the user's D2D-enabled device, such as a global navigation satellite system (GNSS) receiver. An example GNSS receiver is a global positioning system (GPS) receiver.

In the example shown, peaks 103a, 103b were discovered by the search of the terrain map database. Next, the emergency assistance application estimates the maximum communication distances for radio frequency (RF) transmissions from peaks 103a, 103b. In an embodiment, the maximum communication distances are estimated based on a path loss model that accounts for different types of terrain, as described in reference to FIG. 2. In the example shown, the maximum communication distance 104 from peak 103a is determined to be greater than 20 km.

Next, the application searches a database of D2D device density locations to determine which D2D device density locations, if any, fall within the maximum communication distance for peak 103a. In this example, a portion of D2D device density location 105 is found to fall within the maximum communication distance of peak 103a, and is also in close proximity to a trail/path (not shown) that the user can take to reach peak 103a. The same process is also applied to any other peaks found in the search of the terrain map database, such as peak 103b. In this example, however, peak 103b is too far from user 101 and D2D device density location 105 and is therefore not a candidate transmit location.

Next, information for peak 103a is displayed through an output device (e.g., a touch screen) of the user's D2D-enabled device. The display includes a GUI affordance that allows the user to request a route to peak 103a. In accordance with the user's input, the route is generated and presented through the output device as an overlay on a map of the geographic area. In an embodiment, the route is generated from one or more segments of known hiking trails/paths.

Other information can also be presented through the output device, including but not limited to: a name and elevation of the each candidate transmit location (if available in the terrain map data), the distances from the user's current location to each candidate transmit location, a travel direction indicator (e.g., a virtual compass) indicting a direction towards each candidate transmit location or a trail/path leading to each candidate transmit location, an ETA for each candidate transmit location and a maximum communication distance from each candidate transmit location.

In an embodiment, the ETA can be based on an number of factors, including but not limited to: the average hiking/walking speed of an average human or the user's personal average hiking/walking speed determined from historical sensor data (e.g., accelerometer data) collected by motion sensors of the user's D2D-enabled device during past hikes by the user. For example, the average speed of an average hiker is about 2-3 miles per hour (3.2-4.8 km/h). The actual hiking speed of the user, however, can vary based on the experience of the user, the weight of their gear, their fitness level, their comfort range, the terrain (e.g., steep inclines, dense vegetation, many switchbacks), weather conditions (e.g., snow, rain, wind), trail conditions (e.g., rocky, slippery, muddy, partially obscured trail) and any other factors that can influence the user's hiking/walking speed.

In an embodiment, the foregoing factors used to compute the user's average hiking/walking speed can be obtained from the terrain map database or another data source. In an embodiment, the total trail length to the selected candidate transmit location divided by the computed average hiking speed of the user is used to compute a base ETA. The base ETA can then be time adjusted according to the one or more of the factors described above. Depending on the state of emergency, the adjusted base ETA allows the user to determine if they should risk the journey to the selected candidate location or make camp at their current location and wait for emergency assistance.

Once the user has reached peak 103a, the user configures their D2D-enabled device to transmit an emergency beacon. The emergency beacon can include the current location of the user (e.g., latitude, longitude, altitude) and optionally other information that can be used by emergency personnel to find and assist the user. Because of the proximity of peak 103a to D2D device density location 105, there is an increased probability that one or more D2D-enabled devices operating at the D2D device density location will receive the emergency beacon and assist the user.

Maximum Communication Distance Calculations

For a typical radio frequency (RF) transmission system, the received signal strength (link budget) is derived as shown in Equation [1]:

$$R = P_t + G_{tot} - L, \qquad [1]$$

where R (dBm) is the receiver sensitivity, $P_t$ (dBm) is the transmitter power, $G_{tot}$ (dB) is the total gain and L is transmission path loss. Equation [1] can be rearranged as shown in Equation [2]:

$$L = P_t + G_{tot} - R \qquad [2]$$

The path loss L is the largest and most variable quantity in the link budget. Path loss depends on frequency, antenna height, receive terminal location relative to obstacles and reflectors, link distance and terrain, among many other factors. In an embodiment, a statistical path loss model or prediction algorithm is used to estimate a median propagation loss in dB, where the estimate takes into account line-of-sight (LOS) and/or non-LOS signals and the terrain.

In an embodiment, a 3GPP recommended formula for path loss L is given by Equation [3]:

$$L = 40.0 \log_{10}(d) + 7.56 - 17.3 \log_{10}(h_1) - 17.3 \log_{10}(h_2) + 2.7 \log_{10}(f_c), \qquad [3]$$

where $h_1$ and $h_2$ are the heights of the base station (BS) antenna and the mobile station (MS) antenna, respectively, d is the distance between the transmitter and receiver and $f_c$ is the operating frequency or carrier frequency. Substituting Equation [3] into Equation [1] and then solving for distance yields the maximum communication distance $d_{max}$ in free space for a distance d, operational frequency $f_c$ and antenna heights $h_1$ and $h_2$, as shown in Equation [4]:

$$d_{max} = \log_{10}^{-1} \left\{ \frac{[P_t + G_t - R - 7.56 + 17.3\log_{10}(h_1) + 17.3\log_{10}(h_2) - 2.7\log_{10}(f_c)]}{40.0} \right\}. \qquad [4]$$

It is assumed that $P_t$, $G_{tot}$, R and $f_c$ are known based on data sheets for the D2D-enabled devices and/or empirical studies. In an embodiment, the total gain $G_{tot}$ in the link is given by subtracting the total connection loss (dB) from the total antenna gain. For purposes of comparing maximum communication distances for different candidate transmit locations, the transmission variables $P_t$, $G_{tot}$, R and $f_c$ in Equation [4] are set to the same nominal values so that the maximum communication distance is a function of only antenna heights.

In other embodiments, other path loss models that account for different types of terrain can be used, including but not limited to the CCIR (Comite' Consultatif International des Radio-Communication, now ITU-R) path loss model, the Hata path loss model and the Walfisch-Ikegami (WIM) path loss model.

In an embodiment, when selecting among a plurality of candidate transmit locations, Equation [4] can be used to determine which candidate location has a higher maximum communication distance or "max range," and is thus a more desirable location to transmit an emergency beacon. Because antenna height is a primary factor in path loss, candidate transmit locations can be determined by first searching a terrain map database for locations with high elevations (e.g., mountain peaks) that are in close proximity to a trail/path, and then computing the maximum communication distance for the candidate transmit locations using Equation [4]. The transmit and receive antenna heights $h_1$ and $h_2$ are obtained from known elevations of the candidate transmit locations and the D2D device density locations, respectively. The distance d is the RF LOS distance computed from position coordinates of the candidate transmit location and the position coordinates of the D2D device density location, which can also be stored in the terrain map database. In an embodiment, the height $h_1$ of the transmit antenna can be based on an altitude estimate computed by the GNSS receiver in the user's D2D-enabled device. The position coordinates for the D2D device density location can be the center or corner of a cell in a grid covering an area of dense human population or a centroid of any area that is frequently visited my a large number of people (e.g., a popular hiking area).

Figure 2:
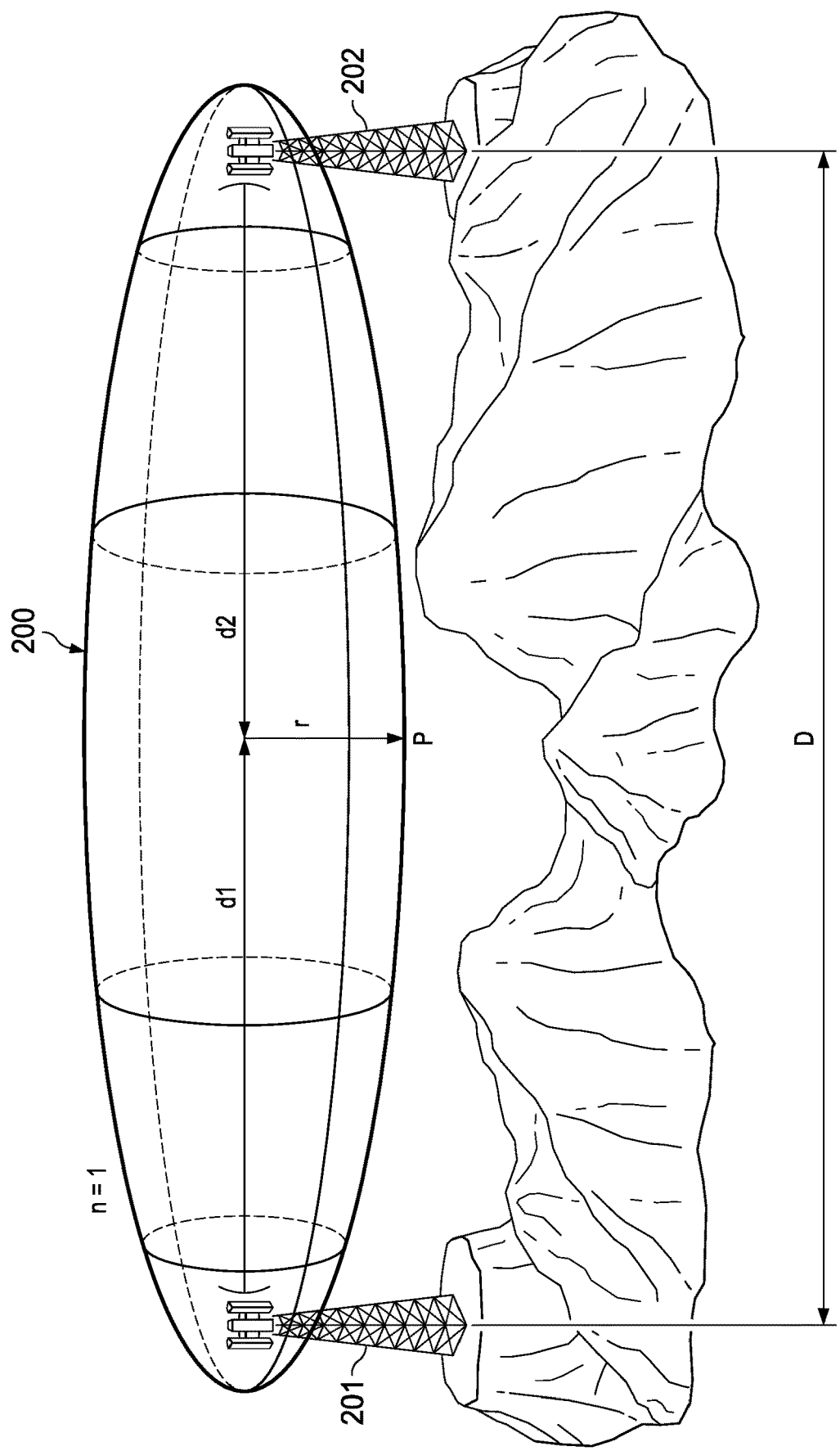
FIG. 2 illustrates determining a maximum communication distance at a candidate transmit location, according to an embodiment.

FIG. 2 illustrates determining of maximum communication distance at a candidate transmit location, according to an embodiment. Fresnel zone 200 can be used to improve upon the accuracy of the maximum communication distance calculation in Equation [4], where the parameter D is the distance between transmitter 201 and receiver 202, r is the radius of a first Fresnel zone (n=1) at point P, and point P is a distance d1 away from the transmitter and a distance d2 away from the receiver. RF LOS is defined by Fresnel zones which are ellipse shaped areas between any two radio antennas. The radius r of the Fresnel zone at its widest point can be calculated based on the distance D between the two radio antennas and the known operational frequency $f_c$ using Equation [5]:

$$r(\text{in meters}) = 17.31 \sqrt{\frac{D(\text{in km})}{4 \times f_{c(\text{in GHz})}}}. \quad [5]$$

In an embodiment, the radius "r" of the Fresnel zone computed in Equation [5] can be used as a factor for comparing candidate transmit locations. For example, if the ratio of the Fresnel zone Earth clearance and the Fresnel zone radius r is greater than a threshold value (e.g., ratio>60%), the transmission path is considered to be a clear LOS and incurs no diffraction loss. Thus, candidate transmit locations that have a lower Fresnel zone radius "r" are more desirable than candidate transmit locations with a higher Fresnel zone radius for determining maximum communication distance from candidate transmit locations. For example, a candidate transmit location with a high estimated maximum communication distance computed by Equation [4] and a low radius "r" computed by Equation [5] would be a good choice for transmitting an emergency beacon because of the reach of the transmission and the zero to low diffraction loss due to the terrain.

Example Process

Figure 3:
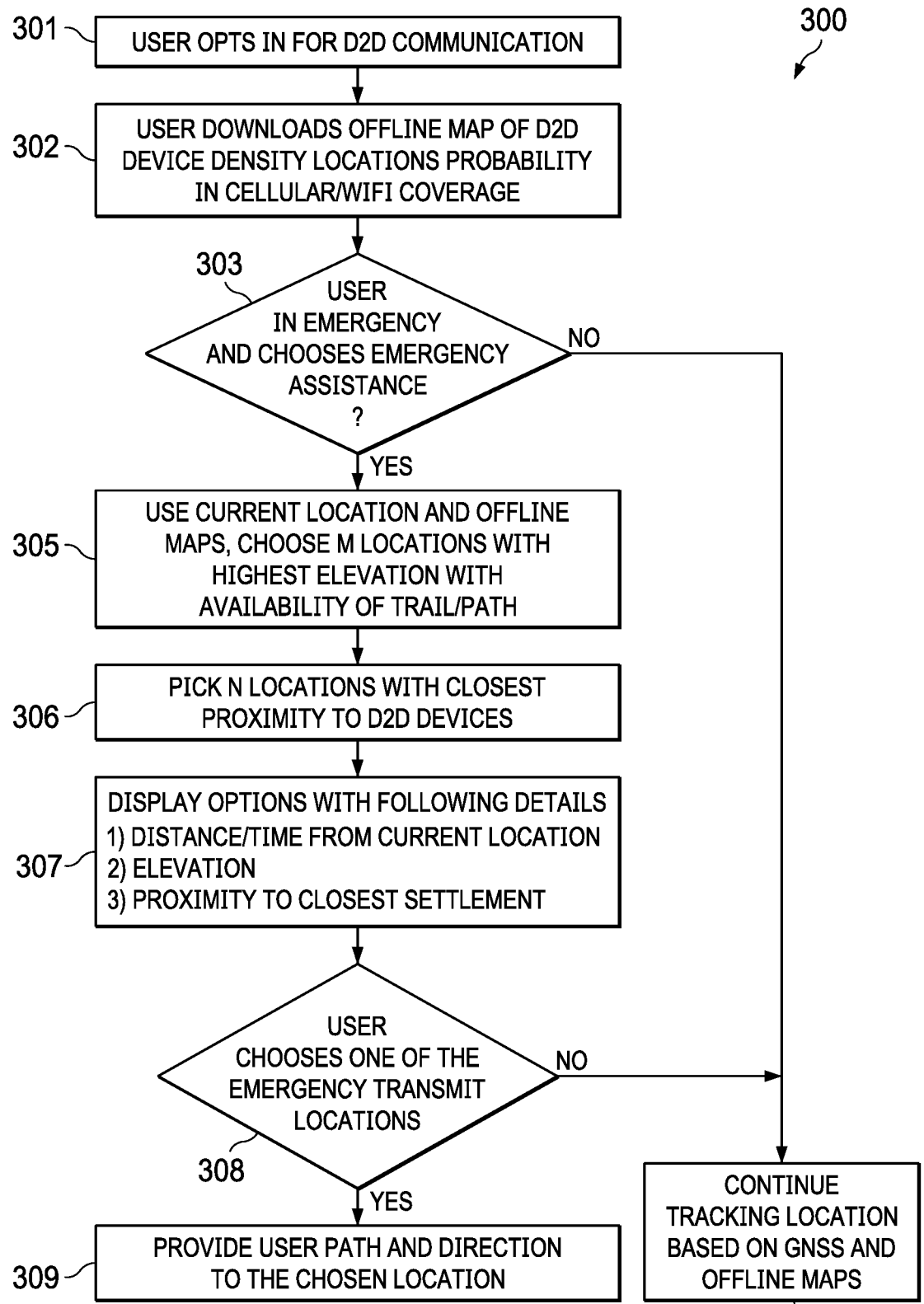
FIG. 3 is a flow diagram of a process for generating candidate transmit locations and selecting a particular candidate transmit location for transmitting an emergency beacon, according to an embodiment.

FIG. 3 is a flow diagram of process 300 for generating candidate transmit locations and selecting a particular candidate transmit location for transmitting an emergency beacon, according to an embodiment. Process 300 can be implemented by mobile device architecture 400, as described in reference to FIG. 4.

Process 300 begins when an emergency assistance application is invoked on a D2D-enable device operating in a geographic area and requests D2D communication (301). In an embodiment, the emergency assistance application is invoked through a GUI affordance (e.g., an icon on a home screen) and/or through a voice command. In an alternative embodiment, the emergency assistance application is invoked automatically in response to a trigger event or by another application or remote device through a wireless connection.

Process 300 continues by downloading a digital terrain map and device density position coordinates and probabilities when the device is still within cellular or WiFi coverage (302). In an embodiment, the terrain map can be a topographic map that includes terrain detail and contour lines (e.g., showing elevations). The terrain map can also include metadata or points-of-interest (POI) data showing areas of human population (e.g., towns, cites, hiking areas), known trails/paths, historic landmarks, prominent natural geographic features (e.g., lakes, oceans, mountains, valleys, rivers), ranger stations or first aid stations and any other descriptive metadata for any feature in the geographic area.

In addition to the terrain map, the device downloads position coordinates and probabilities for D2D device density locations (e.g., areas of dense human population) in the geographic area. The position coordinates and probability data can be delivered in the form of map tiles with overlaid virtual grids dividing the tiles into cells (e.g., 10 mi×10 mi cell size). Each cell is assigned a probability that D2D-enabled devices are operating in the cell. The cells can be any desired shape and size. In an embodiment, the probabilities are determined from crowdsourced data provided by D2D-enabled devices operating in the cells. For example, many mobile devices already crowdsource WiFi access point (AP) location data for use in constructing a WiFi database for device localization using WiFi. In addition to the AP location information, a D2D-enabled device can transmit data indicating that the device is D2D-enabled.

In an alternative embodiment, human population density taken from a census or WiFi AP density can be used as a proxy for determining D2D device density locations under the reasonable presumption that a larger population of humans will have a larger population of D2D-enabled devices operating in the population.

In an embodiment, the triggering of a geofence crossing event (e.g., entering a geofenced region) is used to initiate a download of the terrain map and grids. For example, the device can use its current location to determine if geofence surrounding a national park or hiking area has been crossed by the user, and then transparently download the terrain map tiles and D2D device density location coordinates and probabilities from a cloud-based computing platform using over-the-air (OTA) communication technology. Alternatively, the user can be prompted by their D2D-enabled device to manually initiate/approve the download from the cloud-based computing platform.

Process 300 continues by determining whether a user is in an emergency situation (303). For example, the user can invoke the emergency assistance application as previously described above. In another embodiment, the emergency assistance application is automatically invoked if the sensors on the device detect that the user has fallen, their gait or stride has changed (indicating an injured leg) or their health has been otherwise compromised (e.g., based on heart rate variability).

In accordance with the user being in an emergency situation, process 300 continues by using the current location of the user and D2D device density location probabilities to choose a set of M candidate transmit locations with the highest elevations that can be reached using a known trail/path (305). In an embodiment, a GNSS receiver on the device is used to determine the current location of the device. In an embodiment, locations with desirably high elevations are excluded from the search results if there are no trails/paths in proximity to the current location of the user that lead to the candidate transmit location. Accordingly, the emergency assistance application determines optimum candidate transmit locations with high elevations (for higher max range), that are in close proximity to the current location of the user (the user may be injured and unable to hike long distances) and that are accessible by a trail or path.

Process 300 continues by picking a subset of N candidate transmit locations from the set of M candidate transmit locations with the closest proximity to a D2D density location (306), and then displaying the N candidate transmit locations through an output device (e.g., a touch screen, audio subsystem) of the user's D2D-enabled device (307).

In an embodiment, the information displayed includes but is not limited to: the distance between the current location of the user and the N candidate transmit locations, the elevations of the N candidate transmit locations (e.g., based on elevation contour lines in the terrain map) and the distances of the N candidate transmit locations from D2D device density locations. The N candidate transmit locations can be displayed in a sorted list based on one or more criteria, such as distance to the candidate transmit location and/or the ETA at the candidate transmit location.

In an embodiment, a score can be computed for each candidate transmit location based on a sum of weighted parameters, such as distance, ETA, type of terrain, weather conditions and the physical condition of the user, where the parameters can be weighted the same or differently depending on their impact on success of reaching the selected candidate transmit location. The candidate transmit locations are then displayed through the output device in descending or ascending order according to the scores.

Process 300 continues when the user selects one of the N candidate transmit locations using an input device (e.g., touching an icon on a touch screen) of their D2D-enabled device (308). In an embodiment, the optimum candidate transmit location is automatically selected based on the one or more factors as previously described.

Process 300 continues by generating a route and direction of travel (e.g., a compass heading) to the selected candidate transmit location (309). For example, the terrain map data can be used to generate a route and heading to the selected candidate transmit location. The route can include one or more hiking trail/path segments. The user's D2D-enabled device can then track and display the user's progress on the route through the output device. In an embodiment, turn-by-turn directions can be provided to guide the user from their current location to the beginning of the trail/path.

In accordance with the user not requesting emergency assistance or the user not selecting one of the N candidate transmit locations, the process 300 continues tracking the user's location using GNSS position fixes and the terrain map (304).

Exemplary Mobile Device Architecture

Figure 4:
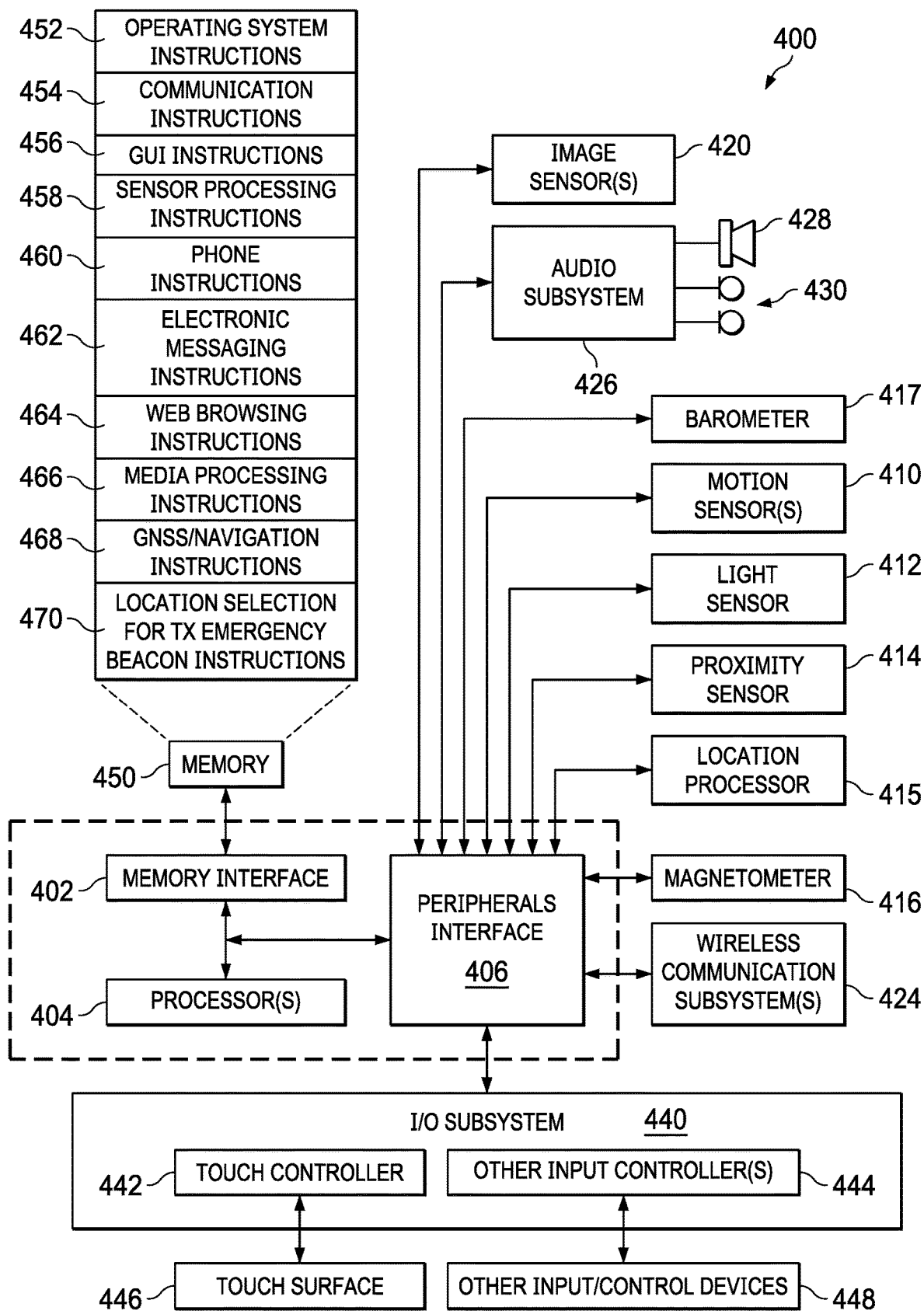
FIG. 4 is example mobile device architecture for implementing the features and operations described in reference to FIGS. 1-3.

FIG. 4 illustrates example mobile device architecture 400 implementing the features and operations described in reference to FIGS. 1-3. Architecture 400 can include memory interface 402, one or more data processors, image processors and/or processors 404 and peripherals interface 406. Memory interface 402, one or more processors 404 and/or peripherals interface 406 can be separate components or can be integrated in one or more integrated circuits.

Sensors, devices and subsystems can be coupled to peripherals interface 406 to provide multiple functionalities. For example, one or more motion sensors 410, light sensor 412 and proximity sensor 414 can be coupled to peripherals interface 406 to facilitate motion sensing (e.g., acceleration, rotation rates), lighting and proximity functions of the wearable computer. Location processor 415 can be connected to peripherals interface 406 to provide geo-positioning. In some implementations, location processor 415 can be a GNSS receiver, such as the Global Positioning System (GPS) receiver. Electronic magnetometer 416 (e.g., an integrated circuit chip) can also be connected to peripherals interface 406 to provide data that can be used to determine the direction of magnetic North. Electronic magnetometer 416 can provide data to an electronic compass application. Motion sensor(s) 410 can include one or more accelerometers and/or gyros configured to determine change of speed and direction of movement of the mobile device. Barometer 417 can be configured to measure atmospheric pressure around the mobile device. In an embodiment, a digital image capture device and a depth sensor 420 can be coupled to peripherals interface 406. The digital image capture device (e.g., a video camera) captures images (e.g., digital photos, video clips) and depth sensor (e.g., infrared, LIDAR) capture depth data (e.g., point cloud data) for rendering three-dimensional scenes for augmented reality (AR) and virtual reality (VR) applications.

Communication functions can be facilitated through wireless communication subsystems 424, which can include radio frequency (RF) receivers and transmitters (or transceivers) and/or optical (e.g., infrared) receivers and transmitters. The specific design and implementation of the communication subsystem 424 can depend on the communication network(s) over which a mobile device is intended to operate. For example, architecture 400 can include communication subsystems 424 designed to operate over a GSM network, 3G, 4G, 5G, a GPRS network, an EDGE network, a WiFi™ network, near field (NF) and a Bluetooth™ network. In particular, the wireless communication subsystems 424 can include hosting protocols, such that the mobile device can be configured as a base station for other wireless devices. Wireless communication subsystems 424 can be configured to perform D2D communication with D2D-enable devices, as described in U.S. patent application Ser. No. 15/876,582, for "Discovery Procedure for Off Grid Radio Service," filed Jan. 22, 2018, which patent application is incorporated by reference herein in its entirety.

Audio subsystem 426 can be coupled to a speaker 428 and a microphone 430 to facilitate voice-enabled functions, such as voice recognition, voice replication, digital recording and telephony functions. Audio subsystem 426 can be configured to receive voice commands from the user.

I/O subsystem 440 can include touch surface controller 442 and/or other input controller(s) 444. Touch surface controller 442 can be coupled to a touch surface 446. Touch surface 446 and touch surface controller 442 can, for example, detect touch contact and movement (gestures) or break thereof using any of a plurality of touch sensitivity technologies, including but not limited to capacitive, resistive, infrared and surface acoustic wave technologies, as well as other proximity sensor arrays or other elements for determining one or more points of contact with touch surface 446. Touch surface 446 can include, for example, a touch screen or the digital crown of a smart watch. I/O subsystem 440 can include a haptic engine or device for providing haptic feedback (e.g., vibration) in response to commands from processor 404. In an embodiment, touch surface 446 can be a pressure-sensitive surface.

Other input controller(s) 444 can be coupled to other input/control devices 448, such as one or more buttons, rocker switches, thumb-wheels, infrared ports, Thunderbolt® ports and USB ports. The one or more buttons (not shown) can include an up/down button for volume control of speaker 428 and/or microphone 430. Touch surface 446 or other controllers 444 (e.g., a button) can include, or be coupled to, fingerprint identification circuitry for use with a fingerprint authentication application to authenticate a user based on their fingerprint(s).

In one implementation, a pressing of the button for a first duration may disengage a lock of the touch surface 446; and a pressing of the button for a second duration that is longer than the first duration may turn power to the mobile device on or off. The user may be able to customize a functionality of one or more of the buttons. The touch surface 446 can, for example, also be used to implement virtual or soft buttons.

In some implementations, the mobile device can present recorded audio and/or video files, such as MP3, AAC and MPEG files. In some implementations, the mobile device can include the functionality of an MP3 player. Other input/output and control devices can also be used.

Memory interface 402 can be coupled to memory 450. Memory 450 can include high-speed random access memory and/or non-volatile memory, such as one or more magnetic disk storage devices, one or more optical storage devices and/or flash memory (e.g., NAND, NOR). Memory 450 can store operating system 452, such as the iOS operating system developed by Apple Inc. of Cupertino, California. Operating system 452 may include instructions for handling basic system services and for performing hardware dependent tasks. In some implementations, operating system 452 can include a kernel (e.g., UNIX kernel).

Memory 450 may also store communication instructions 454 to facilitate communicating with one or more additional devices, one or more computers and/or one or more servers, such as, for example, instructions for implementing a software stack for wired or wireless communications with other devices. Memory 450 may include graphical user interface instructions 456 to facilitate graphic user interface processing; sensor processing instructions 458 to facilitate sensor-related processing and functions; phone instructions 460 to facilitate phone-related processes and functions; electronic messaging instructions 462 to facilitate electronic-messaging related processes and functions; web browsing instructions 464 to facilitate web browsing-related processes and functions; media processing instructions 466 to facilitate media processing-related processes and functions; GNSS/Location instructions 468 to facilitate generic GNSS and location-related processes and instructions; and emergency beacon instructions 470, including instructions for determining candidate transmit locations for transmitting emergency beacons, as described in reference to FIGS. 1-3.

Each of the above identified instructions and applications can correspond to a set of instructions for performing one or more functions described above. These instructions can be implemented as separate software programs, procedures, or modules or as a single body of code. Memory 450 can include additional instructions or fewer instructions. Various functions of the mobile device may be implemented in hardware and/or in software, including in one or more signal processing and/or application specific integrated circuits.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., SWIFT, Objective-C, C#, Java), including compiled or interpreted languages, and it can be deployed in any form, including as a stand-alone program or as a module, component, subroutine, a browser-based web application, or other unit suitable for use in a computing environment.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

What is claimed is:

1. A method comprising:
    determining, using a location processor of a mobile device, a current location of the mobile device in a geographic area;
    configuring a transmitter of the mobile device for device-to-device (D2D) communication;
    determining, using one or more processors of the mobile device, one or more candidate transmit locations for D2D communication, wherein each candidate transmit location is determined based at least in part on its elevation, proximity to a D2D device density location that is within a maximum radio frequency communication distance from the candidate transmit location, and an availability of a trail or path to the candidate transmit location, wherein the maximum radio frequency communication distance is a function of transmit and receive antenna heights;
    receiving input selecting a particular candidate transmit location from the one or more candidate transmit locations;
    in accordance with the input,
        determining, using the one or more processors, a route from the current location of the mobile device to the particular candidate transmit location; and
        presenting the route through an output device of the mobile device.

2. The method of claim 1, further comprising:
    determining an estimated time of arrival (ETA) for each candidate transmit location based on one or more factors; and
    presenting the ETA through the output device.

3. The method of claim 2, further comprising:
    determining, using one or more sensors of the mobile device, a physical condition of a user of the mobile device; and
    determining the ETA for each candidate transmit location based on the physical condition of the user.

4. The method of claim 2, wherein at least one factor is type of terrain in the geographic area.

5. The method of claim 1, wherein determining one or more candidate transmit locations for D2D communication with D2D-enabled devices, further comprises:
    selecting a D2D device density location from a plurality of D2D device density locations for D2D communication with the mobile device based at least in part on a probability that D2D-enabled devices are operating at the D2D device density location.

6. The method of claim 1, wherein the maximum radio frequency communication distance from the candidate transmit location is determined using a path loss model for a type of terrain in the geographic area.

7. The method of claim 1, wherein the maximum radio frequency communication distance from the candidate transmit location is determined at least in part by a ratio of a Fresnel zone Earth clearance and a Fresnel zone radius being greater than a threshold value.

8. The method of claim 1, further comprising:
    determining, using the location processor, that the mobile device has crossed a geofence for the geographic area; and
    downloading, by the mobile device, a terrain map including elevation data for the geographic area and one or more D2D device density locations.

9. The method of claim 1, further comprising:
    computing a score for each candidate transmit location based on a sum of weighted factors;
    sorting the candidate transmit locations by their scores; and
    displaying, through the output device, the candidate transmit locations in descending or ascending order according to their scores.

10. A mobile device comprising:
a location processor configured to determine a current location of the mobile device in a geographic area;
a transmitter configured for device-to-device (D2D) communication;
an input device;
an output device;
one or more sensors;
one or more processors;
memory storing instructions that when executed by the one or more processors, cause the one or more processors to perform operations comprising:
determining one or more candidate transmit locations for D2D communication with D2D-enabled devices, wherein each candidate transmit location is determined based at least in part on its elevation, proximity to a D2D device density location that is within a maximum radio frequency communication distance from the candidate transmit location, and availability of a trail or path to the candidate transmit location, wherein the maximum radio frequency communication distance is a function of transmit and receive antenna heights;
receiving input selecting a particular candidate transmit location from the one or more candidate transmit locations;
in accordance with the input,
determining a route from the current location of the mobile device to the particular candidate transmit location; and
presenting the route through an output device of the mobile device.

11. The mobile device of claim 10, the operations further comprising:
determining an estimated time of arrival (ETA) for each candidate transmit location based on one or more factors; and
presenting the ETA through an output device of the mobile device.

12. The mobile device of claim 11, wherein at least one factor is a physical condition of a user of the mobile device that is indicated by sensor data collected by the one or more sensors.

13. The mobile device of claim 11, wherein at least one factor is type of terrain in the geographic area.

14. The mobile device of claim 10, wherein determining one or more candidate transmit locations for D2D communication with D2D-enabled devices, further comprises:
selecting a D2D device density location from a plurality of D2D device density locations for D2D communication with the mobile device based at least in part on a probability that the D2D device density location includes D2D-enabled devices.

15. The mobile device of claim 10, wherein the maximum radio frequency communication distance from the candidate transmit location is determined using a path loss model for a type of terrain in the geographic area.

16. The mobile device of claim 10, wherein the maximum radio frequency communication distance from the candidate transmit location is determined at least in part by a ratio of a Fresnel zone Earth clearance and a Fresnel zone radius being greater than a threshold value.

17. The mobile device of claim 10, further comprising:
determining, using the location processor, that the mobile device has crossed a geofence for the geographic area; and
downloading, by the mobile device, a terrain map including elevation data for the geographic area and one or more D2D device density locations.

18. The mobile device of claim 10, further comprising:
computing a score for each candidate transmit location based on a sum of weighted factors;
sorting the candidate transmit locations by their scores; and
displaying, through the output device, the candidate transmit locations in descending or ascending order according to their scores.

19. A non-transitory, computer-readable storage medium, including instructions stored thereon, that when executed by one or more processors, cause the one or more processors to perform operations comprising:
determining a current location of a mobile device in a geographic area;
configuring a transmitter of the mobile device for device-to-device (D2D) communication;
determining one or more candidate transmit locations for D2D communication, wherein each candidate transmit location is determined based at least in part on its elevation, proximity to a D2D device density location that is within a maximum radio frequency communication distance from the candidate transmit location, and an availability of a trail or path to the candidate transmit location, wherein the maximum radio frequency communication distance is a function of transmit and receive antenna heights;
receiving input selecting a particular candidate transmit location from the one or more candidate transmit locations;
in accordance with the input,
determining a route from the current location of the mobile device to the particular candidate transmit location; and
presenting the route through an output device of the mobile device.

20. The non-transitory, computer-readable storage medium of claim 19, wherein determining one or more candidate transmit locations for D2D communication with D2D-enabled devices, further comprising:
selecting a D2D device density location from a plurality of D2D device density locations for D2D communication with the mobile device based at least in part on a probability that D2D-enabled devices are operating at the D2D device density location.

* * * * *